United States Patent

Reynard et al.

[11] 3,853,794
[45] Dec. 10, 1974

[54] ALKYLARYLOXYPHOSPHAZENE POLYMERS

[75] Inventors: Kennard A. Reynard, Mentor; Selwyn H. Rose, Beachwood, both of Ohio

[73] Assignee: Horizons Incorporated, a division of Horizons Research Incorporated, Cleveland, Ohio

[22] Filed: June 11, 1973

[21] Appl. No.: 368,847

[52] U.S. Cl............ 260/2 P, 260/2.5 R, 260/33.6 R, 260/47 R, 260/30.4 N, 260/30.4 R
[51] Int. Cl...................... C08g 33/16, C08g 33/02
[58] Field of Search...................................... 260/2 P

[56] References Cited
UNITED STATES PATENTS
| | | | |
|---|---|---|---|
| 3,164,556 | 1/1965 | Apley et al. | 260/2 P |
| 3,370,020 | 2/1968 | Allcock et al. | 260/2 P |
| 3,702,833 | 11/1972 | Rose et al. | 260/2 P |

Primary Examiner—Wilbert J. Briggs, Sr.
Attorney, Agent, or Firm—Lawrence I. Field

[57] ABSTRACT

Poly(alkylaryloxyphosphazenes) with the repeating structure:

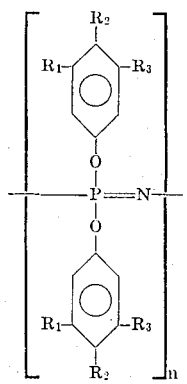

wherein $R_1$, $R_2$ and $R_3$ are selected from hydrogen and alkyl radicals containing one to twelve carbon atoms, with at least one R group being alkyl and n is from 20 to 50,000 are described.

9 Claims, No Drawings

ALKYLARYLOXYPHOSPHAZENE POLYMERS

This invention relates to poly(alkylaryloxyphosphazenes) of novel properties and improved processability. The polymers of this invention are characterized by the repeating structure:

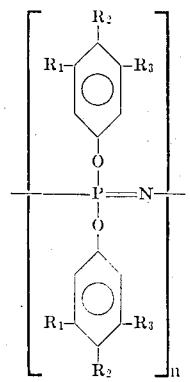

wherein $R_1$, $R_2$, and $R_3$ may be linear or branched alkyl radicals which consist of 1 to 12 carbon atoms, or hydrogen, but at least one of the R groups is not hydrogen; and $n$ is from 20 to 50,000. These polymers have been found to be unexpectedly processable as compared to other high molecular weight aryloxyphosphazene polymers of the prior art.

Low molecular weight liquids which contain some of the substitutents disclosed herein have been described in U.S. Pat. No. 3,505,087. However, the polymers of this invention are high molecular weight plastics.

Aryloxyphosphazene homopolymers have been described in Inorg. Chem., 5, 1709 (1966), United States Patent 3,370,020 and Polymer, 11, 44 (1970). The polymers include $[(C_6H_5O)_2PN]_n$, $[(C_{10}H_7O)_2PN]_n$, and $[(C_6H_5C_6H_4O)_2PN]_n$, as well as a variety of substituted (e.g., Cl, F, CN, $NO_2$ and OR, where R = alkyl or aryl) aryloxyphosphazene homopolymers. Most of these materials have limited solubility, but a few materials can be dissolved and cast from solution to give films of varying quality and limited hydrolytic stability. The latter deficiency may be due to the presence of P–Cl sites. Furthermore, the homopolymers of the prior art are not capable of fabrication by the more desirable procedures such as molding, extrusion, calendaring, and the like, to give thick shaped specimens. Attempts to process the homopolymers of the prior art by these thermal procedures gives poor specimens or, if the temperature is raised in order to induce flow, results in thermal degradation because the temperatures required (150°–200°C) result in the partial decomposition and/or crosslinking of these homopolymers.

In contrast, the alkylaryloxyphosphazene polymers of this invention may be readily processed by thermal techniques between about room temperature and 150°C. For example, $[(3—CH_3C_6H_4O)_2PN]_n$ may be molded into useful articles at 125°C and below at 24,000 lbs/in² pressure. Higher or lower pressures can be employed. The polymers of this invention are particularly useful as molding and damping compositions, as flexible fibers, films, foams and sheeting goods.

One of the alkylaryloxyphosphazene homopolymers of this invention, $[(4—t—C_5H_{11}C_6H_4O)_2PN]_n$, has the further unexpectedly novel property of formation of films of exceptional clarity both when cast from solvents or when molded. Closely related materials, such as $](4—n—C_5H_{11}C_6H_4O)_2PN]_n$, do not form optically clear films.

The polymers of this invention are prepared by the addition of a solution of $[Cl_2PN]_n$ in a suitable solvent such as benzene to a solution of an alkali metal salt of an alkylphenol at temperatures from 115°–160°C over periods of time ranging from 100 to 5 hours. The value of n is between 20 and 50,000. The salt is present in excess and may be dissolved or suspended in any solvent suitable to give the desired temperature. The resultant polyphosphazenes are isolated by methods familiar to those skilled in the art and products which are essentially free of P–Cl sites are obtained.

Process conditions of this invention are critical. Temperatures which are too low or times which are too short will lead to incomplete substitution and result in polymers which are unstable. Temperatures which are too high, and to a lesser extent, times which are too long, give complete substitution but lead to reduction in molecular weight which affects polymer properties.

Commercially available materials may be used in the preparation of the products of this invention. For example, in the preparation of the alkali metal salts a commercially available mixture of $3—CH_3C_6H_4OH$ and $4—CH_3C_6H_4OH$ was used in the substitution reaction to form a poly(alkylaryloxyphosphazene) copolymer. The product was quite similar to the homopolymers prepared from either pure cresol.

The invention is illustrated by the following examples which are not intended to limit the invention.

EXAMPLE 1

Preparation of $[(3—CH_3C_6H_4O)_2PN]_n$

The $[Cl_2PN]_n$ polymer (112.0 g, 1.94 equivs.) was dissolved in 800 ml of benzene and added over 1 hour to a predried (benzene azeotrope) solution of sodium 3-methylphenoxide at 127°C. The aryloxide was prepared from 3-methylphenol (250 g, 2.20 moles) and sodium (48.9 g, 2.12 moles) in 1.8 liters of bis(2-ethoxyethyl)ether/dioxane (3V/1v). The reaction mixture was heated 28 hours at 126°C before polymer was precipitated by addition of 1500 ml of methanol. The polymer was redissolved in 2 liters of methylene chloride, washed exhaustively with distilled water and reprecipitated with methanol. The product (127.1 g, 51% yield) was a soft fibrous plastic which had a $T_g$ of −27°C and an intrinsic viscosity in benzene of 1.8 dl/g at 30°C. Anal. Calcd. for $[(CH_3C_6H_4O)_2PN]_n$: C, 64.9; H, 5.4; N, 5.4; Cl, 0.0. Found: C, 64.6; H, 5.6; N, 5.2; Cl, 0.1. Films were cast readily from benzene and were very flexible and oriented upon drawing. A sample was molded easily at 100° and 20,000 lbs/in² pressure to give a flexible plastic.

EXAMPLE 2

Preparation of $[(4—CH_3C_6H_4O)_2PN]_n$

A solution of $[Cl_2PN]_n$ polymer (100 g, 1.72 equivs.) in 2.0 liters of benzene/xylene (1v/1v) was added slowly to a solution (125°C) of sodium 4-methylphenoxide which was prepared from 4- methylphenol (246.0 g, 2.09 moles), sodium (45.5 g, 1.96 moles) in 2.0 liters of bis(2-ethoxyethyl)ether/dioxane (3v/1v). The reaction mixture was refluxed for 40 hours at 125°C, cooled, and produce precipitated by addition of methanol. The product (143.0 g, 64% yield) which was obtained after exhaustive methanol/water (1v/1v) was a soft, extendable plastic which had an intrinsic viscosity of 2.1 dl/g in benzene at 30°C. Films cast from benzene were opaque, moderately flexible, moderately strong and oriented slightly upon drawing. Values for $T_g$ and $T_m$ were 0° and 123°C, respectively. Anal. Calcd. for $[(CH_3C_6H_4O)_2PN]_n$: C, 64.9; H, 5.4; N, 5.4; Cl, 0.0. Found: C, 65.0; H, 5.4; N, 5.0; Cl, 0.01. Specimens were molded at 75°C and 22,000 lbs/in² pressure and flexible plastics were obtained.

EXAMPLE 3

Preparation of $[(3-CH_3C_6H_4O)_2PN-(4-CH_3C_6H_4O)_2PN]_n$

The $[Cl_2PN]_n$ polymer (11.7 g, 0.20 equiv.) was dissolved in 100 ml of toluene and added over 30 minutes to a solution (115°C) of sodium 3-methyl- and 4-methylphenyloxides which was prepared from 3-methyl- and 4-methylphenol (25.9 g, 0.24 mole; 99% assay as 60% $3-CH_3/40\%$ $4-CH_3$ from Pitt-Consol Chemical Company) and sodium (5.33 g, 0.23 mole) in 150 ml of bis(2-ethoxyethyl)ether/dioxane (3v/1v). The mixture was maintained at 116°C for 48 hours, cooled and polymer was precipitated by addition of methanol. The polymer was dissolved in 300 ml of methylene chloride, exhaustively washed with water and reprecipitated with methanol. The product (8.0 g, 31% yield) was a soft plastic ($T_g$ was −16°C) and an intrinsic viscosity in benzene of 2.6 dl/g at 30°C was obtained. The material was found to self-extinguish when withdrawn from a gas/oxygen flame. Anal. Calcd. for $[(CH_3C_6H_4O)_2PN]_n$: C, 64.9; H, 5.4; N, 5.4; Cl, 0.0. Found: C, 64.7; H, 5.6; N, 5.4; Cl, 0.08. The material was molded easily at ambient temperature and 24,000 psi pressure.

EXAMPLE 4

Preparation of $[(4-C_2H_5C_6H_4O)_2PN]_n$

The $[Cl_2PN]_n$ polymer (110.0 g, 1.90 equivs.) was dissolved in 500 ml of benzene/toluene (1v/1v) and added in 1 hour to a solution (115°C) of sodium 4-ethylphenoxide which was prepared from 4-ethylphenol (254.0 g, 2.08 moles) and sodium (45.8 g, 2.00 moles) in 1 liter of bis(2-ethoxyethyl)ether/dioxane (3v/1v). Benzene was removed until a reflux temperature of 115°C was obtained and reflux was continued for 30 hours. The polymer was precipitated by addition to 2.5 liters of methanol. The polymer was dissolved in 1.5 liters of methylene chloride, exhaustively washed with distilled water and reprecipitated with 5 liters of methanol. The product (125.0 g, 45% yield) was a leathery plastic which had a $T_g$ and $T_m$ of −18° and 53°C, respectively. An intrinsic viscosity in benzene of 1.7 dl/g at 30°C was obtained. Anal. Calcd. for $[(C_2H_5C_6H_4O)_2PN]_n$: C, 67.0; H, 6.3; N, 4.9; Cl, 0.0. Found: C, 66.6; H, 6.1; N, 4.9; Cl, 0.08. Flexible plastic sheets were molded using the conditions given in Example 3.

EXAMPLE 5

Preparation of $[(4-t-C_5H_{11}C_6H_4O)_2PN]_n$

The $[Cl_2PN]_n$ polymer (78.9 g, 1.36 equivs.) was dissolved in 350 ml of benzene and added over 1 hour to a solution at reflux of sodium 4-t-amylphenoxide which was prepared from 4-t-amylphenol (247.0 g, 1.50 moles) and sodium (32.9 g, 1.43 moles) in 1500 ml of dioxane. The reaction mixture was refluxed (125°C) for 31 hours, cooled and polymer was precipitated by addition of 1 liter of methanol. The polymer was dissolved in 2 liters of benzene, exhaustively washed with water and reprecipitated with several volumes of methanol. The product (90.4 g, 36% yield) was a fibrous solid and had an intrinsic viscosity in benzene of 1.5 dl/g at 30°C. Films cast from benzene showed exceptional clarity. This clarity contrasted markedly with the opaque or translucent films obtained from other polymers prepared in this invention such as the polymers of Examples 1–4, and with materials described in the prior art such as $[(C_6H_5O)_2PN]_n$ and $[(4-ClC_6H_4O)_2PN]_n$. Anal. Calcd. for $](C_5H_{11}C_6H_4O)_2PN]_n$: C, 71.2; H, 8.1; N, 3.8; Cl, 0.0. Found: C, 70.6; H, 7.9; N, 3.6; Cl, 0.1. Samples were molded at 140°C and 24,000 psi to give clear, slightly brittle specimens.

EXAMPLE 6

Preparation of $[(4-n-C_5H_{11}C_6H_4O)_2PN]_n$

The $[Cl_2PN]_n$ polymer (11.6 g, 0.20 equiv.) was dissolved in 100 ml of benzene/xylene (1v/1v) and added to a predried (benzene azeotrope) solution of sodium 4-amylphenoxide at 120°C which was prepared from 4-n-amylphenol (47.5 g, 0.29 mole) and sodium (5.04 g, 0.22 mole) in 150 ml of bis(2-ethoxyethyl)ether/dioxane (3v/1v). The mixture was maintained at 120°C for 27½ hours, cooled and polymer was precipitated by addition of 1 liter of methanol. The material was redissolved in 0.5 liter of methylene chloride, exhaustively washed with water, and reprecipitated with 1.5 liters of methanol. The product (13.2 g, 36% yield) was a tan, slightly waxy, fibrous plastic and had an intrinsic viscosity in benzene of 2.0 dl/g at 30°C. The $T_g$ and $T_m$ were −66° and 39°C, respectively. Anal. Calcd. for $[(C_5H_{11}C_6H_4O)_2PN]_n$: C, 71.2; H, 8.1; Cl, 0.0. Found: C, 70.8; H, 8.1; Cl, 0.07. Samples were molded easily at room temperature and 20,000 psi to give flexible sheets, but unlilke the homopolymer of Example 5, the samples were translucent.

EXAMPLES 7–10

The soluble poly(alkylaryloxyphosphazenes) of Examples 7–10 were prepared following the procedure of Example 1 except that the indicated alkylphenol was used instead of 3-methylphenol and reaction conditions were 50 to 100 hours at 125°C.

| Example | Alkylphenol Used | $[\eta]^a$ | Analysis Found (%)[a] | | | |
|---|---|---|---|---|---|---|
| | | | C | H | N | Cl |
| 7 | 3,5-dimethylphenol | 3.9 | 66.8 (67.0) | 6.4 (6.3) | 4.9 (4.9) | 0.05 (0) |

Continued

| Example | Alkylphenol Used | $[\eta]^a$ | Analysis Found (%)[b] | | | |
|---|---|---|---|---|---|---|
| | | | C | H | N | Cl |
| 8 | 3,4-dimethylphenol | 1.7 | 66.9 | 6.5 | 4.8 | 0.07 |
| | | | (67.0) | (6.3) | (4.9) | (0) |
| 9 | 3,4,5-trimethylphenol | 2.2 | 68.8 | 7.1 | 4.5 | 0.03 |
| | | | (68.6) | (7.0) | (4.4) | (0) |
| 10 | 4-nonylphenol | 1.8 | 74.3 | 9.6 | 2.8 | 0.1 |
| | | | (74.5) | (9.5) | (2.9) | (0) |

[a] Intrinsic viscosity in benzene at 30°C
[b] Calculated values in parentheses.

EXAMPLE 11

Preparation of $[(C_6H_5O)_2PN]_n$ (Comparative)

The $[Cl_2PN]_n$ polymer (900.0 g, 15.6 equivs.) was dissolved in 6.0 liters of dry benzene/chlorobenzene (7v/5v) and added in 5½ hours to a dried solution (125°C) of sodium phenoxide which was prepared from phenol (2115 g, 22.5 moles) and sodium (476.0 g, 20.7 moles) in 12.0 liters of bis(2-methoxyethyl)ether. The reaction mixture was heated 50 hours at 125°C. Polymer was precipitated by addition to 20.0 liters of methanol and purified by washing with 20.0 liters of methanol, exhaustively washed with distilled water and was slurried twice with 10.0 liter portions of methanol. The product (993.0 g, 55.4% yield) was a white fibrous solid which had an intrinsic viscosity of 1.5 dl/g in tetrahydrofuran at 30°C. Tough, flexible films were cast from tetrahydrofuran. Anal. Calcd. for $[(C_6H_5O)_2PN]_n$: C, 62.3; H, 4.3; N, 6.1; Cl, 0.0. Found: C, 62.3; H, 4.4; N, 6.0; Cl, <1 ppm. Attempts to mold the $[(C_6H_5O)_2PN]_n$ homopolymer at temperatures of 80°, 120°, 150° and 200°C at 24,000 psi pressure in all cases gave brittle specimens.

EXAMPLE [

Preparation of $(4-ClC_6H_4O)_2PN]_n$ (Comparative)

The $[Cl_2PN]_n$ polymer (100 g, 1.72 equivs.) was dissolved in 600 ml of benzene/toluene (3v/2v) and added to a solution (123°C) of sodium 4-chlorophenoxide which had been prepared from 4-chlorophenol (267 g, 2.08 moles) and sodium (42.7 g, 1.85 moles) in 1.3 liters of bis(2-ethoxyethyl)ether/dioxane (3v/1v). The mixture was maintained at 126°C for 26 hours, after which polymer was precipitated by addition of 1.3 liters of methanol. The polymer was slurried repeatedly with methanol/water (1v/1v) and was dissolved in 2 liters of tetrahydrofuran and reprecipitated by addition of 4 liters of water. The product (140 g, 54% yield) was a tough, white plastic and had an intrinsic viscosity in tetrahydrofuran of 1.8 dl/g at 30°C. The $T_g$ and $T_m$ were 5° and 141°C, respectively. Films cast from tetrahydrofuran were strong and flexible and oriented upon drawing. The product did not contain P–Cl sites and was unaffected by moisture at elevated temperatures. Anal. Calcd. for $[(ClC_6H_4O)_2PN]_n$: C, 48.0; H, 2.7; N, 4.7; Cl, 23.7. Found: C, 48.2; H, 2.9; N, 4.8; Cl, 23.5. Attempts to mold the $[(4-ClC_6H_4O)_2PN]_n$ at temperatures of 80°, 120°, 150° and 200°C at 24,000 psi pressure in all cases gave brittle specimens.

EXAMPLE 13

Attempted Preparation of $[(4-CH_3C_6H_4O)_2PN]_n$ (Comparative)

The $[Cl_2PN]_n$ polymer (220.0 g, 3.80 equivs.) was dissolved in 2 liters of benzene and added over 3 hours to a solution at reflux of sodium 4-methylphenoxide which was prepared from 4-methylphenol (492.9 g, 4.56 moles) and sodium (92.0 g, 4.0 moles) in 3 liters of dioxane. The reaction mixture was refluxed (93°C) for 27.5 hours and polymer was precipitated by addition to 5 liters of methanol. The liquor was decanted, evaporated, triturated with methanol-water (1v/1v) and dried to yield 157 g (32%) of gummy paste. The polymer was rinsed with methanol, dissolved in 3 liters of methylene chloride and washed extensively with distilled water, was reprecipitated by addition to 12 liters of methanol, and dried to give 270 g (55%) of a fibrous plastic. The intrinsic viscosity in benzene was 2.2 dl/g at 28°C. Anal. Calcd. for $[(CH_3C_6H_4O)_2PN]_n$: C, 64.9; H, 5.4; N, 5.4; Cl, 0.0. Found: C, 62.9; H, 5.4; N, 5.4; Cl, 2.2. The high chlorine atom content of this polymer indicated reaction temperature was not high enough to insure almost complete replacement of all P–Cl bonds. The polymers were found to be sensitive to moisture-induced crosslinking.

EXAMPLE 14

Attempted Preparation of $[(2-CH_3C_6H_4O)_2PN]_n$ (Comparative)

The $[Cl_2PN]_n$ polymer (50.0 g, 0.43 equiv.) was dissolved in 500 ml of benzene and added over one-half hour to a solution of sodium 2-methylphenoxide at 125°C. The aryloxide was prepared from 2-methylphenol (121.3 g, 1.13 moles) and sodium (22.8 g, 1.0 mole) in 1.0 liter of bis(2-ethoxyethyl)ether/dioxane (3v/1v). The reaction mixture was heated 19 hours at 128°C and polymer was precipitated by addition of 2 liters of methanol. The polymer was dissolved in benzene, washed with water and reprecipitated with methanol. The product (57.6 g, 51.7% yield) was a soft, light brown plastic with an intrinsic viscosity in benzene of 1.0 dl/g at 30°C. Anal. Calcd. for $[(CH_3C_6H_4O)_2PN]_n$: C, 64.9; H, 5.4; N, 5.4; Cl, 0.0. Found: C, 62.3; H, 5.1; N, 5.5; Cl, 3.9. The high chlorine atom content of this polymer indicated reaction temperature was not high enough to insure almost complete replacement of all P–Cl bonds. The polymers were found to be sensitive to moisture-induced crosslinking.

We claim:

1. Poly(alkylaryloxyphosphazenes) characterized by the repeating structure:

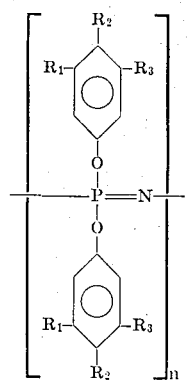

where $R_1$, $R_2$ and $R_3$ are each selected from hydrogen and alkyl radicals containing 1 to 12 carbon atoms, with at least one of $R_1$, $R_2$, and $R_3$ being alkyl, and $n$ is from 20 to 50,000.

2. The polymer of claim 1 wherein $R_1$ is $CH_3$ and $R_2$ and $R_3$ are H.

3. The polymer of claim 1 wherein $R_2$ is $CH_3$ and $R_1$ and $R_3$ are H.

4. The polymer of claim 1 wherein $R_2$ is tert-amyl and $R_1$ and $R_3$ are H.

5. The polymer of claim 1 wherein $R_1$ and $R_3$ are $CH_3$ and $R_2$ is H.

6. A poly(alkylaryloxyphosphazene) copolymer wherein the groups bonded to phosphorus are 3-methylphenoxy and 4-methylphenoxy.

7. A process for the preparation of completely substituted poly(alkylaryloxyphosphazenes) of claim 1 which comprises reacting of $[Cl_2PN]_n$ polymer with an alkylphenoxide salt at 115°–160°C for 5 to 100 hours.

8. Shaped Compositions and films prepared from the polymers of claim 1.

9. Poly(alkylaryloxyphosphazenes) of claim 1 in which all of the substituted phenoxy groups are alike.

* * * * *